June 9, 1964

A. D. FRENCH 3,136,992

FIRE CONTROL SYSTEM HARMONIZATION

Filed June 30, 1958

Inventor:
Allen D. French,
by Francis K. Doyle
His Attorney.

Inventor:
Allen D. French,
by Francis X. Doyle
His Attorney.

3,136,992
FIRE CONTROL SYSTEM HARMONIZATION
Allen Davis French, Manlius, N.Y., assignor to General
Electric Company, a corporation of New York
Filed June 30, 1958, Ser. No. 745,770
1 Claim. (Cl. 343—7)

This invention relates to fire control systems and more particularly to means for harmonizing the fire control system in which the positioning of a turret and gun is harmonized with a target tracking device such as a radar antenna whereby the projectile fired from the gun will hit the target being tracked by the antenna.

Fire control systems of this nature are generally comprised of a target detecting and locating device such as a radar or the like which radiates impulses into space and receives reflected impulses or echoes back by means of reflection from objects. The reflected impulses from a desired target may be selected and from these impulses the range and position of the target may be determined. This data is then utilized by suitable computers and servo mechanisms to position the gun to fire projectiles at this target. Because the path of these projectiles does not follow a straight line, but rather follows variable ballistic trajectories, affected by temperature, pressure, wind velocity, vibration of the aircraft and other factors, corrections are added by means of a computer mechanism to compensate for these variables so that the gun axis is deliberately displaced from the radar line of sight to the target in order that the ballistic trajectory of a typical projectile will pass through the target location.

In order to align such a fire control system, the gun axis and the radar line of sight are generally aligned with the computer circuits not adding any corrections to the system. This process is generally termed harmonization. If this alignment is done in the proper manner, with accuracy, the fire control system would score hits, assuming that the computer adds accurately, all of the necessary ballistic corrections. To accurately perform this procedure elaborate optical, mechanical, and electrical harmonization apparatus has been devised to calibrate or harmonize the gun and the radar before before the system is placed in operation. In aircraft fire control apparatus the calibration or harmonization of the gun with the radar is generally performed on the ground using artificial targets with various types of test apparatus in connection with measurements taken during firing tests. However, there is no present known method providing accurate harmonization of the gun and the radar during dynamic operation, that is while actually airborne. This is considered necessary since it is well known that variations in muzzle velocity, pressure, temperature and the like occur at various altitudes and speeds of the aircraft which variations cannot be duplicated during ground harmonization. Also, there is no known method of harmonizing the gun and radar so as to eliminate any error which may exist in the computer alignment mechanism.

Another problem ordinarily arising with gun fire control systems is the problem of determining the distance by which fired projectiles actually miss the target. This information is necessary in order that the gun position may be corrected to enable later fired projectiles to strike the target. Trail and error adjustments have been made in the air by observing the position of a tracer projectile and then estimating the distance by which the tracer projectile misses the target. However, discounting the necessary skill of an aerial gunner in estimating correctly this distance and making the necessary manual corrections in gun position, this correction is still, of necessity, inaccurate since it is well known that tracer projectiles do not have the same trajectories as ordinary projectiles.

Therefore, it can be readily seen that there is a great necessity in fire control systems for a means of dynamically harmonizing the gun and the radar under normal, inflight, operating conditions, so that a projectile fired from the gun may be made to pass through a target position sighted by the radar. It is also evident that some means of informing the aerial gunner of the actual distance by which the projectile from the gun actually misses the proposed target must be provided, in order that the aerial gunner can make adequate corrections in the gun position to insure that later fired projectiles will strike the target.

It is accordingly one object of this invention to provide a means for indicating the location of a projectile in space referenced to a target or to a designated area in space.

Another object of this invention is to provide a means for harmonizing the path of a projectile in flight with a particular portion of a radar beam.

A still further object of this invention is to provide a means for informing an aerial gunner of the actual distance by which a fired projectile misses a proposed target.

A still further object of this invention is to provide a harmonizing means which may be readily added to present day fire control systems whereby the gun and radar of the fire control system may be harmonized without in any way affecting the over-all operations of the fire control system.

In carrying out this invention in one form there is provided a means associated with a fire control system whereby the position of a fired projectile may be observed in space, referenced to the radar line of sight of the fire control system. Means are also provided to measure the actual displacement of the position of the fired projectile from the radar line of sight whereby the distance by which the projectile misses such center line may be accurately calculated and the position of the gun adjusted such that later fired projectiles will coincide with the radar line of sight at the target position.

Further, in accordance with this invention these means may be incorporated within the gun fire control system itself or may be a light weight unit which may be added to present day fire control systems whereby the fire control systems may be harmonized under dynamic conditions. Since this harmonization means is employed while the plane is in the air under actual flight conditions this invention provides a closer aproximation to ideal automatic gun fire control systems of perfect accuracy than has heretofore been attainable.

This invention will be better understood and the manner in which its objects and advantages are obtained, by a consideration of the following description taken in connection with the accompanying drawings, in which.

Although the preferred embodiment of the present invention to be described is disclosed in connection with a gun fire control system for aircraft employing a radar target tracking equipment, it is to be understood that this invention is not limited to either radar or aircraft use, but may be employed with ground based installations or with land or sea going vehicles as well, and may be combined with other types of target tracking equipment, such as those using infrared or ultraviolet detector systems. It should also be understood that this invention is not limited to gun fired projectiles, but may be used with rockets, missiles and the like.

Figure 1:
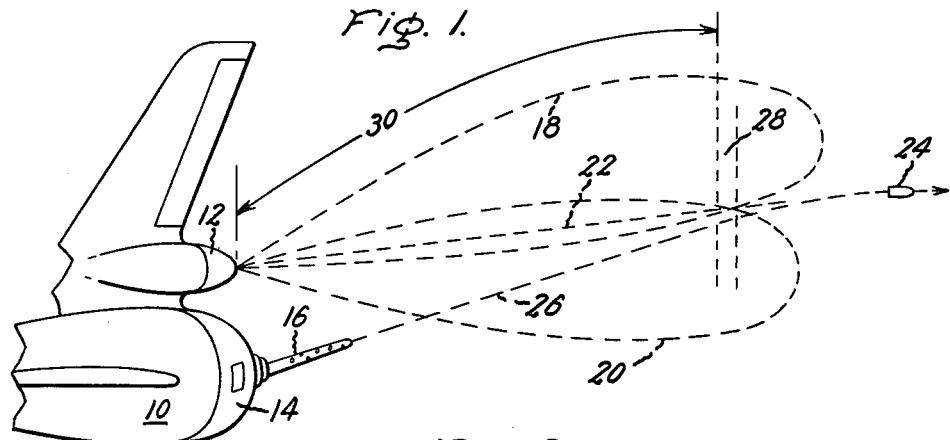
FIGURE 1 is a diagrammatic sketch schematically illustrating the measured quantities of a fire control system.

Referring now to the drawings wherein like numerals are used to indicate like parts throughout and in particular with reference to FIGURE 1, there is shown the tail portion of an aircraft, generally designated 10. The tail portion of the aircraft incorporates a fire control system comprising a radome 12 which encloses suitable impulse radiating elements and which is electrically connected to position a gun turret 14 housing a gun 16. In conventional systems of this type, the radar transmitter propagates a directional pattern of energy into space as is diagrammatically shown by the over-lapping loops 18 and 20 symmetrically disposed about what is termed the radar line of sight or center line 22. Of course, it will be understood that while the over-lapping loops 18 and 20 are shown only in a horizontal direction these over-lapping loops radiate completely around the center line 22 somewhat in a form of a conical pattern. As is well known to those skilled in the art, by measuring the time for an echo or a reflected impulse to be received from a target and by noting the position of this echo within the directional pattern indicated by 18 and 20, the range and location of a target referenced to the center line 22 may be determined, and this information can then be utilized through suitable computing networks to automatically position gun 16 in azimuth and elevation so that a projectile 24 fired by the gun would strike the indicated target. However, due to the ballistics trajectory and other factors determining the path 26 of the projectile 24 the axis of the gun 16 is not pointed directly at the target but is deliberately misaligned therefrom so that the trajectory path 26 will intercept the target location. As has been pointed out, under practical operating conditions many of the factors affecting the projectile path cannot be exactly measured and, therefore, despite the most accurate and expensive calibrations on the ground the actual projectiles fired in the air may miss the target by a considerable distance.

To reduce the time and cost of ground harmonization, as well as reducing the harmonization error which occurs during actual flight conditions, the present invention provides means for actually measuring a portion of the flight path of a test fired projectile, referenced to the center line of the radar, and thereafter employs this measurement to align or harmonize the gun and the radar. In other words, the present invention may be considered to actually use the projectile itself as part of the mechanization for harmonizing gun and radar by utilizing the projectile to form a closed loop servo interconnecting the radar and gun positioning equipment.

More specifically, in accordance with this invention, means are provided for setting up an area in space a known distance from the aircraft. This known space position is a portion of the total radar pattern and the radar equipment is focused on this position. The projectile 24 fired by the gun 16 will provide a reflected impulse or echo which will be noted by the radar thus informing the aerial gunner of the exact position of the projectile 24 as it passes through this known area in space. For example, consider the area designated by the lines 28 within the pattern indicated by the overlapping loops 18 and 20 at a given range 30 from the radome 12. It can be seen by the trajectory path 26 that the projectile 24 will pass somewhat beneath the radar center line 22.

Figure 2:
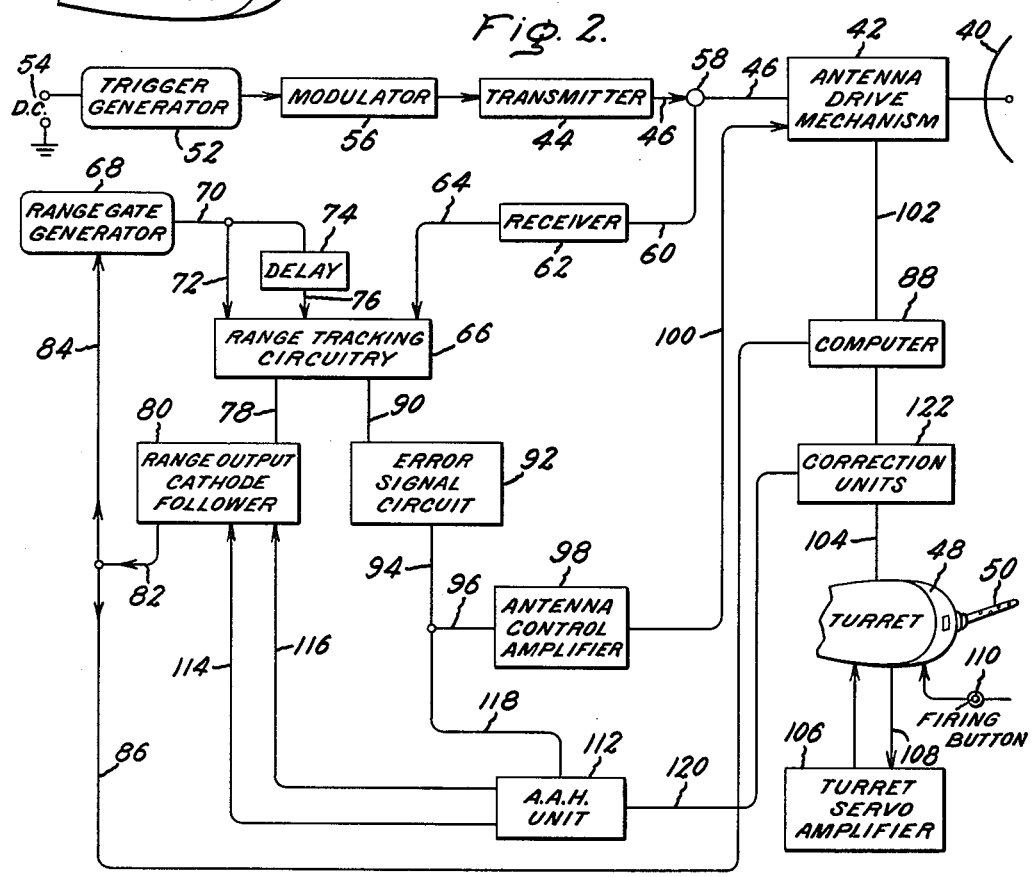
FIGURE 2 is an electrical block diagram of a conventional fire control system showing one form of connecting the harmonization device of this invention to the fire control system.

Referring now to FIGURE 2, there is shown a block diagram which represents a complete fire control system and showing one form of incorporating the present invention within such fire control system. As shown in FIGURE 2, a radar antenna 40 and its associated drive mechanism 42 is connected to a radar transmitter 44 by means of a wave guide or other type of transmission line 46 to propagate an electro-magnetic beam (not shown) into space and to receive a reflected electro-magnetic beam from any target located within the propagated beam. A gun turret 48 housing a gun 50 is interconnected by electronic and mechanical circuitry shown by the individually labeled block for measuring and controlling the position of the gun 50 to fire projectiles at a target located by the radar beam.

Part of the fire control system shown in block form in FIGURE 2 is a conventional fire control system and its operation is well known to those skilled in the art. Therefore, the operation of the conventional portion of this fire control system will only be briefly discussed. As is well known, a trigger generator 52 is connected to a source of D.C. power 54 for providing trigger pulses which are utilized to operate modulator 56. The modulator in turn provides the necessary energy to operate the transmitter 44 which sends a pulse of RF energy through transmission line 46 to the antenna 40 for radiation of an electromagnetic beam into space. When a target is present capable of reflecting energy, an RF pulse is reflected back to the antenna 40 and is carried back over a portion of transmission line 46 through a 2 way switching device 58, as is well known to those skilled in the art, and over line 60 to receiver 62. The receiver 62 is provided with conventional circuitry which converts the RF signal into a video pulse. This video pulse is fed over line 64 into the range tracking circuit 66, from which circuit, and other associated circuits, is derived the necessary information to properly position the fire control system on the target.

A range gate generator 68 develops a signal which is transmitted over line 70 and through line 72 to the range tracking circuit 66 to provide an early gate. The range gate generated signal is also transmitted over line 70 through a delay circuit 74 and through line 76 to the range tracking circuit 66 to develop a late gate. The early and late gates position themselves about the video pulse received from receiver 62, such that they track this video pulse whenever it changes its range in space. This range information is sent from the range tracking circuit 66 over line 78 to the range output cathode follower 80, and this range voltage is fed back over lines 82 and 84 to the range gate generator 68 so as to form a closed loop range servo. The range voltage is also fed from the range output cathode follower 80 over line 82 and line 86 to a computer 88 for inclusion in the ballistic computation for the positioning of the turret 48 and gun 50. As is well known in the art, the operation of the closed loop range servo is such that whenever the target changes its range the range gates automatically reposition themselves on the target's new location.

The gated video signal which is obtained from the range tracking circuit 66 in conjunction with the early and late gate is fed over line 90 to the error signal circuit 92 where it is transformed into azimuth and elevation error signals. The azimuth and elevation error signals are fed over lines 94, 96 to antenna control amplifier 98. If antenna 40 is not pointed directly at the target, the antenna control amplifier 98 will generate the necessary signals, which are fed over line 100, to drive the antenna drive mechanism 42 to position the antenna on the target. Once the antenna 40 is properly positioned on the target, the azimuth and elevation position information are sent from the antenna drive mechanism 42 over line 102 to the computer 88. In the computer 88, in conjunction with the range and environmental information, these signals are modified in accordance with ballistic equations and the corrected azimuth and elevation information is fed to the turret 48 over line 104. If the turret 48 is not positioned in accordance with the corrected azimuth and elevation signals which are supplied from the computer 88 the turret servo amplifier 106 will be energized by these signals over line 108 to drive the turret 48 until it comes into correspondence with the position indicated by the azimuth and elevation signals. As is well known to those skilled in the art, when the turret is properly positioned on the target the gunner may fire on the target by actuation of firing button 110.

In order that the fire control system herein described may be provided with aerial harmonization such that the alignment of the gun 50 may be harmonized with the center line of the antenna 40 a means 112 is incorporated into the fire control system to provide the desired harmonization. The means 112 includes circuits to drive the fire control system through the necessary stages of operation to satisfactory accomplish airborne aerial harmonization. As indicated in FIGURE 2, the aerial harmonization unit 112 supplies a fixed range voltage over line 114 to the range output cathode follower 80 and at the same time provides a blocking voltage over line 116 to prevent normal operation range output cathode follower 80. The fixed range voltage supplied to the range output cathode follower 80 by means of line 114 overpowers the closed loop range servo and causes the entire operation of the range tracking system to be focused on this fixed range. Additional means are provided in the harmonization unit 112 to provide for stowing the turret 48 in the dead aft position. The aerial harmonization unit 112 then provides means for firing the gun 50, which sends a projectile through the range gate, that is a fixed area in space within the radar beam, which is set up at the pre-selected range by the fixed range voltage applied to the range output cathode follower 80. The RF pulses reflected back at the time the projectile passes through this fixed range gate are received by the antenna 40, and passed on to the receiver 62 and the range tracking circuit 66. The gated video error signal from the range tracking circuit 66 is fed over line 90 to the error signal circuit 92 if there is any error in the projectile position as it passes through the range gate with respect to the center line of the antenna position. This error signal is applied over lines 94 and 118 to the aerial harmonization unit 112 and thence over line 120 to a correction unit 122 which functions in conjunction with the computer 88. The correction unit 122 adds an additional correction to the elevation and azimuth information from the computer 88 to thereby remove the positional error from the turret 48 and gun 50.

Thus the aerial harmonization unit 112 provides a method for measuring the electrical and mechanical errors present in the fire control system and for providing the necessary correction into the fire control system to eliminate such errors.

Figure 3:
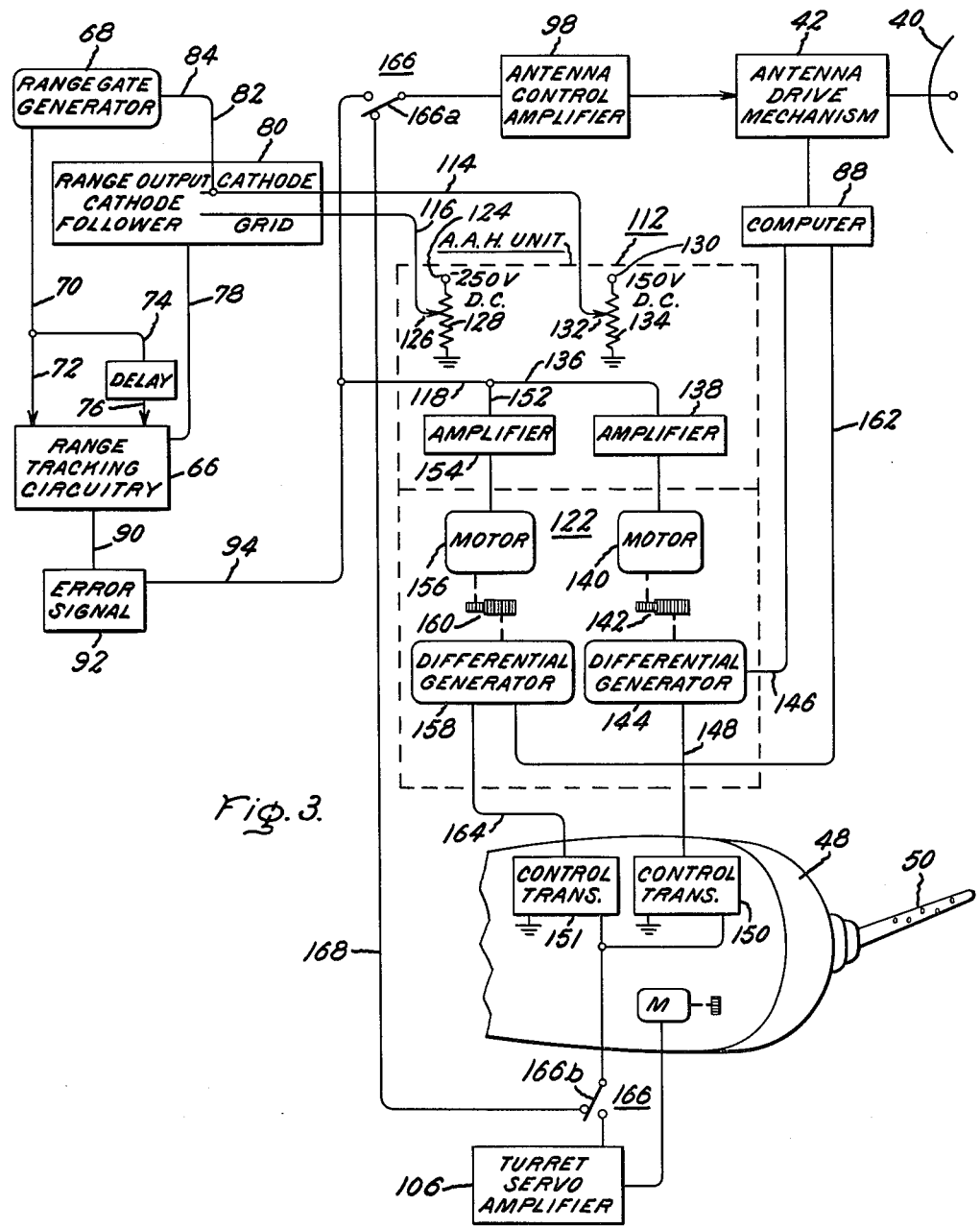
FIGURE 3 is a schematic diagram of portions of the block diagram shown in FIGURE 2 showing some of the electrical connections of the harmonization means of this invention with the fire control system.

The electrical connections of the aerial harmonization unit 112 into the fire control system as well as the circuitry utilized in the aerial harmonization unit are shown in detail in FIGURE 3. Referring now to FIGURE 3, the range output cathode follower 80 which is utilized in the fire control system to provide the desired range voltage signals to the closed loop range servo (represented by the range gate generator 68, the early and late gate signals 72 and 76, and the range tracking circuits 66) is shown as being connected to the aerial harmonization unit 112 by lines 114 and 116. As previously described, line 116 places a blocking voltage on the range output cathode follower 80 to prevent its normal operation during aerial harmonization. This voltage is supplied to the grid of the range output cathode follower 80 as shown in FIGURE 3, the voltage being derived from a voltage source 124 which is shown as a negative voltage source of 250 volts D.C. and the desired blocking voltage is obtained by means of a sliding contact 126 on a potentiometer 128 placed across the negative voltage source 124. The desired range at which the fire control system is focused, is determined by the fixed range voltage placed on the cathode of the range output cathode follower over the line 114. This voltage is obtained from a D.C. voltage source 130 and is varied to obtain the desired range by means of a sliding contact 132 on a potentiometer 134, which is connected across the D.C. voltage source 130 as indicated in FIGURE 3. The D.C. voltage source 130 is preferably 150 volts D.C.

As hereinbefore described, the range tracking circuit 66 provides a gated video signal in conjunction with the early gate 72 and the late gate 76 which is fed over a line 90 to the error signal circuit 92. This gated video signal is transformed into azimuth and elevation error signals which are supplied to the aerial harmonization unit 112 over the lines 94 and 118. As shown in FIGURE 3 the azimuth error signal is fed through the aerial harmonization unit 112 over a line 136 and into an azimuth signal amplifier 138. The output of the amplifier 138 is utilized to drive a motor 140, the motor 140 being connected by gearing 142 to a differential generator 144. The differential generator 144 receives azimuth signals from the antenna drive mechanism 42 through computer 88 over the line 146. The azimuth signal from the antenna 42 and computer 88 is combined in the differential generator 144 with the azimuth signal supplied through motor 140 and gearing 142 to form a corrected azimuth error signal which is fed over the line 148 to a control transformer 150 of the gun turret 48. In a similar manner the elevation error signal is fed through the aerial harmonization unit 112 over line 152 to an elevation signal amplifier 154 where it is amplified and utilized to drive a motor 156. The motor 156 is connected to a differential generator 158 by means of gearing 160. The elevation differential generator 158 is provided with the elevation error signal from the computer 88 over line 162 and forms a corrected elevation signal which is fed to turret 48 over line 164 to a control transformer 151, in the same manner as the corrected azimuth signal. The corrected azimuth and elevation signals are fed from the control transformers 150 and 151 to the antenna control amplifier 98, in a manner about to be described, and position the antenna 40 relative to the turret 48 and gun 50 so that later projectiles fired will pass through the target position.

A switch 166 is provided, operating in conjunction with the aerial harmonization unit 112, to feed the corrected azimuth and elevation signals to the antenna control amplifier 98. As shown in FIGURE 3, switch 166 has one pole 166a which breaks the circuit connection between the error signal circuit 92 and the antenna control amplifier 98, and connects the amplifier 98 to a line 168. A second pole 166b of switch 166, breaks the connection between the control transformers 150, 151 and the turret servo amplifier 106, and connects the transformers 150, 151 with the line 168. Therefore, the corrected azimuth and elevation signals are fed from the control transformers 150, 151, over the line 168 to the antenna control amplifier 98. The output of the antenna amplifier 98 energizes the antenna drive motors, which drive the antenna to the desired position, as indicated by the error signals. Since most fire control systems provide means for stowing the turret in a dead aft position, less components and circuitry are needed to provide aerial harmonization by positioning the antenna relative to the turret and gun. However, it should be understood, that if desired, the antenna could be stowed and the turret and gun positioned to provide the desired harmonization. Whichever manner is used, when the fire control system is returned to normal operation, the correction made in the relative positions of the antenna and the turret and gun remain fixed, thus providing the desired accuracy to the fire control system.

The correction units, shown as a block 122 in FIGURE 2, are shown in FIGURE 3 as included in the aerial harmonization unit 112. The correction units comprise the motors 140, 156, the gearing 142, 160 and the differential generators 144, 158. Where aerial harmonization is to be added to present day fire control systems it is desirable that the units 112 and 122 be included in a single light weight device as shown in FIGURE 3. Where aerial harmonization is included in the fire control systems hereafter produced, the units 112 and 122 may be combined or separate, according to design choice.

From the above it can be seen that the range output cathode follower 80 is supplied with fixed range voltage from a D.C. voltage source 130 and thereby provides a fixed range gate by means of a closed servo comprising the output cathode follower 80, the range gate generator 68, the early and late gates 72 and 76, and the range tracking circuit 66. This fixed range gate is effectively a fixed area in space in the radar beam so that a projectile fired from the gun 50 passing through the fixed range gate will provide a reflected signal back into the fire control system which is utilized by the range tracking circuit 66 to provide a gated video signal to the error signal circuit 92, where it is transformed into the azimuth and elevation error signals. As hereinbefore explained, these azimuth and elevation signals are utilized by means of the components of the aerial harmonization unit 112 to align the turret 48 and therefore, the gun 50 so that succeeding projectiles from the gun 50 will pass through the center line of the radar at the target position.

While the invention has been shown as providing automatic correction of the turret position, it is obvious that, if desired, a radar scope could be provided, showing the gunner the distance by which the projectile missed the target position. The desired corrections could then be manually made by the gunner to insure that the next projectile would pass through the target position.

From the above description it can be readily seen that by this invention there is provided an aerial harmonization means which can be utilized to harmonize the antenna and the gun of a fire control system under actual flight conditions. Of course, it will be understood that the aerial harmonization device described in this application may be in the form of a small light weight unit which may be connected to present day fire control systems or, alternatively, may be built into fire control systems which are hereafter produced. While there has been shown and described a preferred embodiment of this invention, it will be obvious to those skilled in the art that many variations may be made in the circuits described without departing from the spirit and scope of the invention as defined in the appended claim.

What is claimed as new, and which is desired to be secured by Letters Patent of the United States is:

A radar gunfire control system adapted for self-calibration by measuring mid-flight projectile position and including correction units responsive to error signals derived at a predetermined mid-flight range comprising:

(a) radar range circuits for producing signals representative of the position of a target within the radar beam of the fire control system;

(b) means electrically connected to said range circuits for directing the radar beam center line in azimuth and elevation relative to the gun boresight;

(c) correction gating means for gating radar signal returns at a predetermined mid-flight range; and (d) correction units connected to the gun and responsive to error signals produced by said range circuits as gated by said gating means to store said error signals and to introduce integrated correction signals to the gun, whereby later fired projectiles will pass through the target position.

References Cited in the file of this patent
UNITED STATES PATENTS

| | | |
|---|---|---|
| 2,409,462 | Zworykin | Oct. 15, 1946 |
| 2,479,565 | Grossman | Aug. 23, 1949 |
| 2,840,810 | Bailey | June 24, 1958 |